UNITED STATES PATENT OFFICE 2,472,437

DEHYDROABIETIC ACID DERIVATIVES

Yolanda T. Pratt, Mount Rainier, Md., assignor to Hercules Powder Company, Wilmington, Del., a corporation of Delaware No Drawing. Application February 26, 1947, Serial No. 731,039

4 Claims. (Cl. 260—97)

This invention relates to new derivatives of dehydroabietic acid and more particularly to dehydroabietic acid derivatives containing a methylene group in the 6-position.

Now in accordance with this invention it has been discovered that by the introduction of a chloromethyl or a bromomethyl group into the 6-position in dehydroabietic acid, a new series of compounds may be prepared, which compounds have the formula:

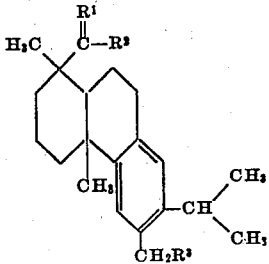

where $R^1$ is one of the group consisting of O and $H_2$; $R^2$ is one of the group consisting of OH, O-metal, O-alkyl, and $NH_2$; and $R^3$ is one of the group consisting of Cl, Br, OH, SH, CN, SCN, COOH, COO-metal, $OSO_3H$, $OSO_3$-metal, $NH_2$, NHX, $NX_2$, $NX_3^+$, OX, in which X is an alkyl radical.

These new compounds may be prepared by reacting dehydroabietic acid with formaldehyde and hydrogen chloride or hydrogen bromide in the presence of an acid catalyst. The 6-chloro- or 6-bromo-methyldehydroabietic acid which is formed by this reaction may be then converted to the alcohol, amine, mercaptan, thiocyanate, etc. The new compounds, being difunctional, provide a valuable series of compounds of widely varied use.

The following examples are illustrative of the new series of compounds in accordance with this invention. All parts and percentages are by weight unless otherwise indicated.

EXAMPLE I

Chloromethyldehydroabietic acid

Fifty parts of dehydroabietic acid, 6.6 parts of paraformaldehyde and 15 parts of 100% phosphoric acid were mixed with 100 parts of glacial acetic acid. The reaction mixture was agitated and heated to 110° C. during a period of ½ hour and held at that temperature for 15 hours, dry hydrogen chloride being bubbled into the reaction mixture during the heating period. After cooling, the reaction mixture was diluted with water and extracted with ether to obtain an ethereal solution of the product. The ether layer was washed free of acid with water and dried over sodium sulfate. Evaporation of the ether gave 56.1 parts of 6-chloromethyldehydroabietic acid which was a pale yellow resin that could not be crystallized.

EXAMPLE II

Methyl 6-chloromethyldehydroabietate

Five parts of the above chloromethyldehydroabietic acid were treated with an excess of diazomethane in an ether solution. The ether solvent was removed by evaporation and the product was fractionally crystallized from petroleum ether to obtain methyl 6-chloromethyldehydroabietate which had a melting point of 118°–120° C.

EXAMPLE III

6-hydroxymethyldehydroabietic acid

Chloromethyldehydroabietic acid (34 parts), prepared as described in Example I, was refluxed with a solution of 20 parts of potassium hydroxide in 380 parts of water for 1½ hours. The resulting clear solution was washed with ether and then was acidified and extracted with ether. The ether extract was washed, dried and evaporated after which the residue was refluxed for 2 hours with 20 parts of potassium hydroxide in 15 parts of water and 400 parts of diethylene glycol. The resulting solution was diluted, acidified and extracted with ether. The ether extract was washed, dried and the ether removed by evaporation whereby 29 parts of crude product were obtained. The crude 6-hydroxymethyldehydroabietic acid was recrystallized first from benzene and then from benzene and ether to obtain a product which had a melting point of 192°–194° C. and a specific rotation of $+73°$ for a 1% solution in absolute ethanol.

EXAMPLE IV

6-aminomethyldehydroabietic acid acetate

Five parts of chloromethyldehydroabietic acid, prepared as described in Example I, were dissolved in 300 parts of absolute ethanol which was saturated with ammonia. The solution was allowed to stand for 1 week at room temperature and then was evaporated to dryness. The residue was dissolved in acetic acid, heated to boiling, after which an excess of water was added and the mixture was allowed to stand for 2 days. The crystalline product was removed by filtration, dried, washed with ether and recrystallized from dilute acetic acid to obtain 6-aminomethyldehydroabietic acid acetate which had a melting point of 245°–246° C. and contained 3.6% nitrogen (theory 3.6% nitrogen).

EXAMPLE V

*6-aminomethyldehydroabietic acid, 6-aminomethyldehydroabietic acid hydrochloride*

Chloromethyldehydroabietic acid (37.8 parts) was refluxed for 20 minutes with 11.7 parts of hexamethylenetetramine in 75 parts of chloroform. The solvent was then partially evaporated and the complex was filtered off and washed with chloroform and ether to obtain 42 parts (96%) of a colorless product. The complex was heated at 110° C. with 24 parts of concentrated hydrochloric acid and 66 parts of ethanol for 1 hour, a portion of the acid and alcohol was distilled off and an additional 8 parts of concentrated hydrochloric acid and 22 parts of ethanol were added and the heating was continued for 1 hour. This last step was repeated and finally all of the solvent was distilled off. The residue was extracted with boiling water and on cooling the aqueous extract deposited 20.5 parts (yield 58%) of the amine hydrochloride.

The above 6-aminomethyldehydroabietic acid hydrochloride was dissolved in pyridine and the free amine was precipitated by the addition of water. On recrystallization from isopropanol the 6-aminomethyldehydroabietic acid monohydrate was found to have a melting point of 239°–240.5° C. and contained 4.0% nitrogen (theory 4.0%.)

EXAMPLE VI

*6-thiocyanomethyldehydroabietic acid*

A solution of 5.6 parts of potassium thiocyanate in 20 parts of absolute ethanol was heated to reflux and a solution of 10 parts of 6-chloromethyldehydroabietic acid in 50 parts of absolute ethanol was added drop by drop to the agitated thiocyanate solution. The reaction mixture was refluxed for 5 hours, cooled, and the precipitate of inorganic salt was filtered off. The filtrate was evaporated to dryness, water was added to the residue and the insoluble resin was extracted with ether. The ether solution was dried and evaporated to dryness whereby 11 parts (72% yield) of 6-thiocyanomethyldehydroabietic acid was obtained.

EXAMPLE VII

*6-mercaptomethyldehydroabietic acid*

A solution of 62 parts of 6-chloromethyldehydroabietic acid and 13.7 parts of thiourea in 100 parts of absolute ethanol was refluxed for 3 hours. About half of the alcohol was distilled off and after cooling 1000 parts of ether were added. On standing a white, crystalline precipitate was obtained which amounted to 37.3 part· (100% theory). The crude isothiouronium salt was recrystallized from an ethanol-isopropyl ether solvent containing a small amount of concentrated hydrochloric acid. The isothiouronium methyldehydroabietic acid hydrochloride was obtained as white, needlelike crystals which contained 7.3% sulfur (theory 7.5%), 6.49% nitrogen (theory 6.59%) and 7.9% chlorine (theory 8.3%).

The isothiouronium hydrochloride was converted to the mercaptan by refluxing 35 parts of it with 100 parts of 10% sodium hydroxide solution for 3 hours. The reaction mixture was cooled, acidified with dilute sulfuric acid and finally was extracted with ether.

The ether solution was washed with water, dried and evaporated whereby 27.3 parts (96% yield) of 6-mercaptomethyldehydroabietic acid were obtained as a pale yellow resin which could not be crystallized and which contained 9.3% sulfur (theory 9.25%) and had a neutral equivalent of 350 (theory 347).

The new series of compounds in accordance with this invention is prepared by substituting a methylene group in the 6-position of dehydroabietic acid. This may be accomplished by the chloromethylation or by the bromomethylation of dehydroabietic acid whereby the chloromethyl or bromomethyl group enters the 6-position in the dehydroabietic acid nucleus; i. e., the position ortho to the isopropyl group in the benzene ring of dehydroabietic acid. The halogen in this position is very reactive and thus a whole new series of compounds may be prepared; for example, the corresponding alcohol, amine, nitrile, thiocyanate, mercaptan, ether, etc.

In addition, the carboxyl group of the 6-chloromethyldehydroabietic acid or derivatives formed therefrom may undergo the usual reactions of salt formation, alcoholysis, ammonolysis, reduction, etc., to form the corresponding salt, ester, amide, alcohol, etc., thus providing further variations in this new series of compounds.

The chloromethylation of dehydroabietic acid may readily be carried out by heating dehydroabietic acid with formaldehyde, paraformaldehyde or trioxane and hydrogen chloride in the presence of an acid catalyst such as phosphoric acid, sulfuric acid, aluminum chloride, stannic chloride or zinc chloride. While the reaction may be carried out in the absence of a catalyst, higher yields are usually obtained when a catalyst is used. The reaction may also be carried out using formalin and aqueous hydrochloric acid in p'ace of formaldehyde and hydrogen chloride. The formaldehyde may also be substituted by methylal or chloromethyl ether. It is usually preferable to carry out the reaction in a solvent such as glacial acetic acid. The temperature at which the reaction is carried out is dependent upon the solvent, catalyst and other conditions, but usually is from about 50° C. to about 120° C. When paraformaldehyde in glacial acetic acid is used with gaseous hydrogen chloride and phosphoric acid as catalyst the preferable temperature is from about 70° C. to about 110° C.

The bromomethyl group may be introduced by the same process as that used for the introduction of the chloromethyl group, hydrogen bromide being substituted for the hydrogen chloride used in that example.

The chlorine of the chloromethyl group may be hydrolyzed to form 6-hydroxymethyldehydroabietic acid by heating the 6-chloromethyldehydroabietic acid with an alkali metal hydroxide such as sodium or potassium hydroxide. In carrying out this reaction, the alkali metal salt of 6-chloromethyldehydroabietic acid may be formed which on heating yields a product believed to be the lactone. Further hydrolysis of this intermediate product then converts it to the desired 6-hydroxymethyldehydroabietic acid. The dialcohol, 6-hydroxymethyldehydroabietyl alcohol, may be prepared by the reduction of the carboxyl group of the 6-hydroxymethyl derivative.

The 6-cyano- and 6-thiocyano-methyldehydroabietic acids may be prepared by replacing the chlorine or bromine with the nitrile or thiocyanate groups. For example, by heating the 6-chloromethyldehydroabietic acid with sodium, potassium or ammonium thiocyanate in an organic solvent such as alcohol, 6-thiocyanomethyldehydroabietic acid is formed. In the same way the cyano derivative may be formed by heating the chloro derivative with sodium, potassium or ammonium cyanide. By the hydrolysis of this nitrile group, a dicarboxylic acid may be formed.

In a similar fashion, the chlorine of the chloromethyl group may be replaced by the sulfate or sulfite group by reaction with an alkali metal sulfate or sulfite.

Alkyl 6-methylenedehydroabietic acid ethers may be prepared by reacting an ester of 6-chloromethyldehydroabietic acid with an alkali metal alcoholate such as sodium methylate, ethylate, etc., whereby the alkyl ether of the 6-chloromethyldehydroabietic ester is obtained. To obtain the free acid containing the ether group, this ester may then be saponified.

Sulfur derivatives of 6-chloromethyldehydroabietic acid may be formed by replacing the chlorine with an isothiouronium, a mercapto, or a sulfide group. The 6-mercapto derivative may be formed by heating 6-chloromethyldehydroabietic acid with thiourea to form the isothiouronium salt and then hydrolyzing this salt with an alkali metal hydroxide. It may also be prepared by heating the 6-chloromethyl compound with an alkali metal acid sulfide such as sodium acid sulfide.

Amines may be formed by heating the 6-chloromethyl derivative with ammonia, hexamethylenetetramine or with any convenient amine to form primary, secondary, or tertiary amines or quaternary ammonium salts. In turn, the 6-aminomethyl derivatives may be reacted with an acid to form the corresponding salts of the amines, such as the hydrochloride, acetate, etc. Diamines may be formed by subjecting the 6-aminomethyldehydroabietic acid to reductive amination, whereby the carboxyl group is converted first to a nitrile and then to the amine group, to form 6-aminomethyldehydroabietyl amine.

The new series of compounds containing a methylene substituent in the 6-position of dehydroabietic acid are very valuable in that they are all difunctional, having the carboxyl group or other functional group in the 1-position of the dehydroabietyl radical and a second functional group in the 6-position. Thus, they offer a wide variety of possibilities in many valuable uses. For example, the chloromethyl derivative may be used as an intermediate in the synthesis of many other derivatives as may be seen in the foregoing examples or the sodium salt of the chloromethyl acid may react with itself to form a polymer, the 6-hydroxymethyldehydroabietic acid and esters thereof are of use in alkyd-type resins, and the amino derivatives are valuable in the formation of resinous polyamides, detergents, etc. The mercapto derivative has use as an antioxidant particularly for ethyl cellulose, as an oil additive, and as a modifier for synthetic rubber. The thiocyano derivative may be used as the toxic ingredient in insecticidal compositions.

What I claim and desire to protect by Letters Patent is:

1. As new compositions of matter, compounds derived from dehydroabietic acid having the following general formula:

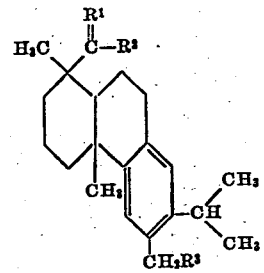

where $R^1$ is one of the group consisting of O and $H_2$; $R^2$ is one of the group consisting of OH, O-metal, O-alkyl and $NH_2$; and $R^3$ is one of the group consisting of Cl, Br, OH, SH, CN, SCN, COOH, COO-metal, $OSO_3H$, $OSO_3$-metal, $NH_2$, NHX, $NX_2$, $NX_3^+$, OX, in which X is an alkyl radical.

2. 6-chloromethyldehydroabietic acid.
3. 6-aminomethyldehydroabietic acid.
4. 6-mercaptomethyldehydroabietic acid.

YOLANDA T. PRATT.

REFERENCES CITED

The following references are of record in the file of this patent:

UNITED STATES PATENTS

| Number | Name | Date |
|---|---|---|
| 2,084,213 | Osterhof | June 15, 1937 |

OTHER REFERENCES

Fieser et al., Jour. Am. Chem. Soc., vol. 61, Sept. 1939, pp. 2528–2534.